(12) United States Patent
Ouboter

(10) Patent No.: US 6,206,388 B1
(45) Date of Patent: Mar. 27, 2001

(54) SCOOTER BOARD

(76) Inventor: Jan Wim Ouboter, Bahnhofstrasse 10, CH-8700, Küsnacht, Zürich (CH)

( * ) Notice: Subject to any disclaimer, the term of this patent is extended or adjusted under 35 U.S.C. 154(b) by 0 days.

(21) Appl. No.: 09/310,780

(22) Filed: May 14, 1999

(51) Int. Cl.[7] .................................................. B62M 1/00
(52) U.S. Cl. ...................................................... 280/87.042
(58) Field of Search .......................... 280/87.01, 87.021, 280/87.041, 87.042, 29, 260, 263, 47.11, 87.043, 87.05, 62, 47.34, DIG. 9, 268, 11.19

(56) References Cited

U.S. PATENT DOCUMENTS

| | | | | |
|---|---|---|---|---|
| 1,128,810 | * | 2/1915 | Martin | 280/87.042 |
| 1,201,800 | * | 10/1916 | Byron | 280/47.11 |
| 1,689,682 | * | 10/1928 | Rainey | 280/47.11 |
| 1,784,875 | * | 12/1930 | Jesswein | 280/47.11 |
| 2,193,411 | * | 3/1940 | Sheldon | 280/87.01 |
| 2,495,935 | * | 1/1950 | Kreeger | 280/87.01 |
| 2,763,493 | * | 9/1956 | Hutchinson | 280/47.11 |
| 3,539,196 | * | 11/1970 | Fleming | 280/62 |
| 3,704,897 | * | 12/1972 | Bagge et al. | 280/47.34 |
| 3,751,062 | * | 8/1973 | White, Sr. | 280/87.041 |
| 4,775,162 | * | 10/1988 | Chao | 280/87.041 |
| 5,704,623 | * | 1/1998 | Chapman | 280/47.11 |

FOREIGN PATENT DOCUMENTS

0304585  *  3/1989  (EP) .

* cited by examiner

*Primary Examiner*—Brian Johnson
*Assistant Examiner*—Bryan Fischmann
(74) *Attorney, Agent, or Firm*—Charles E. Baxley

(57) ABSTRACT

A scooter board includes a board having a rear wheel and two branches extending inclinedly downward from the front end thereof. A transverse plate is located between the two branches and has two links pivotally connected to the two ends thereof. The two links are pivotally connected to the two branches and each of which has a front wheel connected thereto. A control bar extends upwardly from the front end of the board and has two rods extending therefrom which clamp a protrusion extending from the mediated portion of the transverse plate so that when pushing the control bar, the transverse plate is shifted due to the connection between the two rods and the transverse plate so as to control the directions the front wheels turn.

4 Claims, 4 Drawing Sheets

SCOOTER BOARD

FIELD OF THE INVENTION

The present invention relates to a scooter board, and more particularly, to a scooter board having a control bar extending from the top surface thereof which has two rods extending therefrom and connected to a transverse plate connected to the two links, when pushing the control bar the two front wheels connected to the links turn and will return to their original position when releasing the control bar.

BACKGROUND OF THE INVENTION

A conventional scooter board generally has a board with two front wheels and a rear wheels connected to the bottom thereof, a handle extending from the front end so as to control the turning movement. The handle has to be adjustable so that different users may properly hold the handle and control the directions to turn. If the handle is too low or too high for the user, it is difficult to operate the scooter board properly. However, a high manufacturing cost is incurred because it needs a complicated structure to let the handle to be adjustable. In addition, the user has to hold the handle firmly so that the direction of the movement of the scooter board can be kept. In order to hold the handle, both of the user's hands are used so that the user is limited to perform other action.

The present invention intends to provide a scooter board which is suitable for various persons to use, especially since the control bar needs only one hand to hold it so that the structure of the control system is simplified and the user is allowed to perform other actions with the other hand.

The present invention provides a scooter board which has a simple structure and is easily to operate so that the inherent shortcomings of the conventional scooter board can be mitigated.

SUMMARY OF THE INVENTION

In accordance with one aspect of the present invention, there is provided a scooter board comprising a board with a rear wheel and two branches extending inclinedly downward from the front end thereof. A control bar extends upwardly from the front end of the board and has two rods extending therefrom. A transverse plate located between the two branches has a protrusion extending from the mediated point thereof and is clamped between the two rods by a ring. Two links each have the first end thereof pivotally connected to the two respective ends of the transverse plate. The two links are pivotally connected to the two branches at the two respective second ends thereof. Two front wheels are respectively connected to the two links. The directions that the two front wheels turn can be handled by pushing the control bar so as to shift the transverse plate and pivot the two links.

It is an object of the present invention to provide a scooter board wherein the directions that the two front wheels turn are controlled by pushing the control bar extending from the front end of the board.

Another object of the present invention is to provide a scooter board wherein the control bar fits different users' size and is easily to operate.

These and further objects, features and advantages of the present invention will become more obvious from the following description when taken in connection with the accompanying drawings which show, for purposes of illustration only, several embodiments in accordance with the present invention.

DETAILED DESCRIPTION OF THE PREFERRED EMBODIMENT

Figure 1:
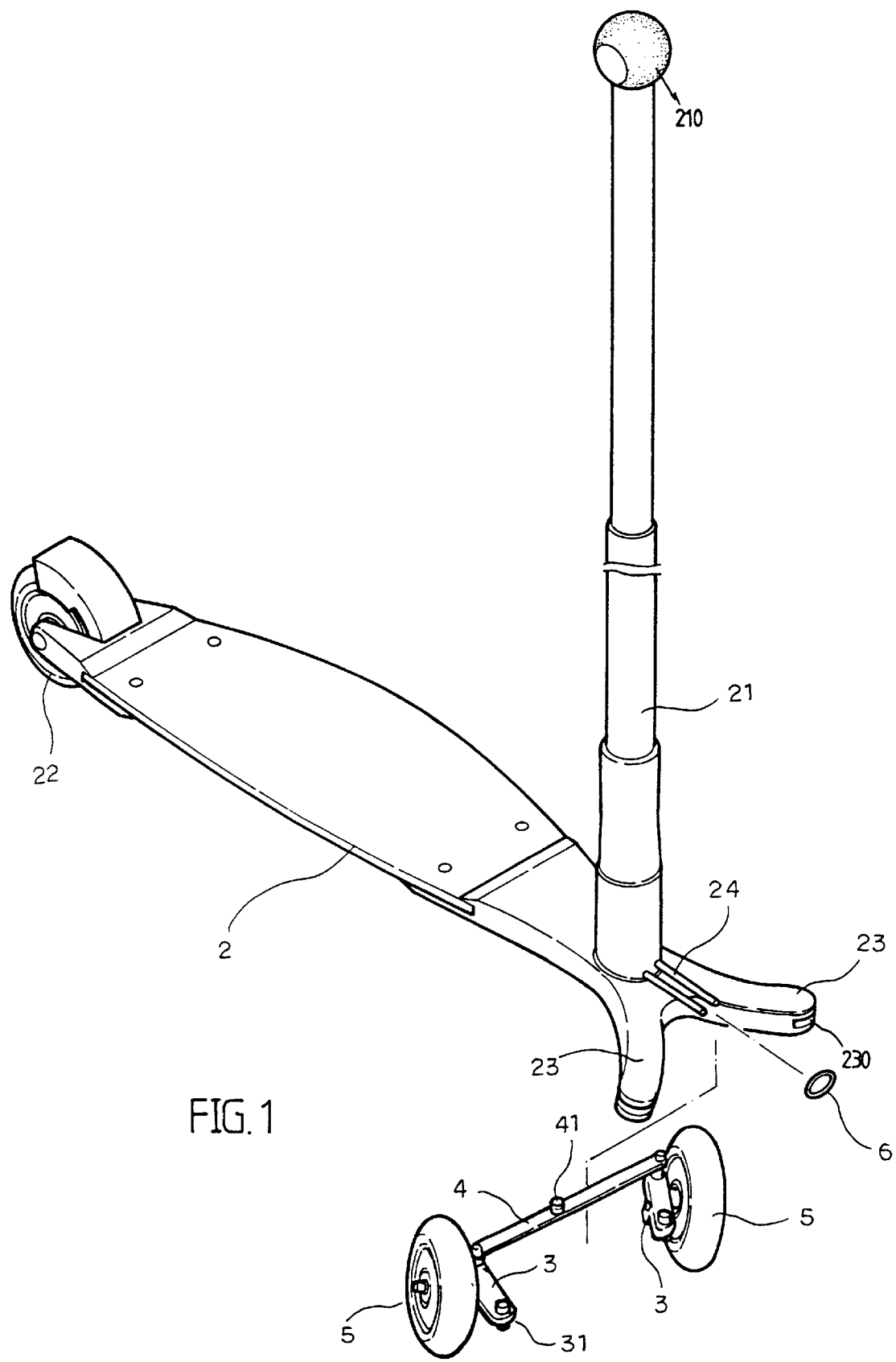
FIG. 1 is an exploded view of the scooter board in accordance with the present invention.
Figures 2, 3:
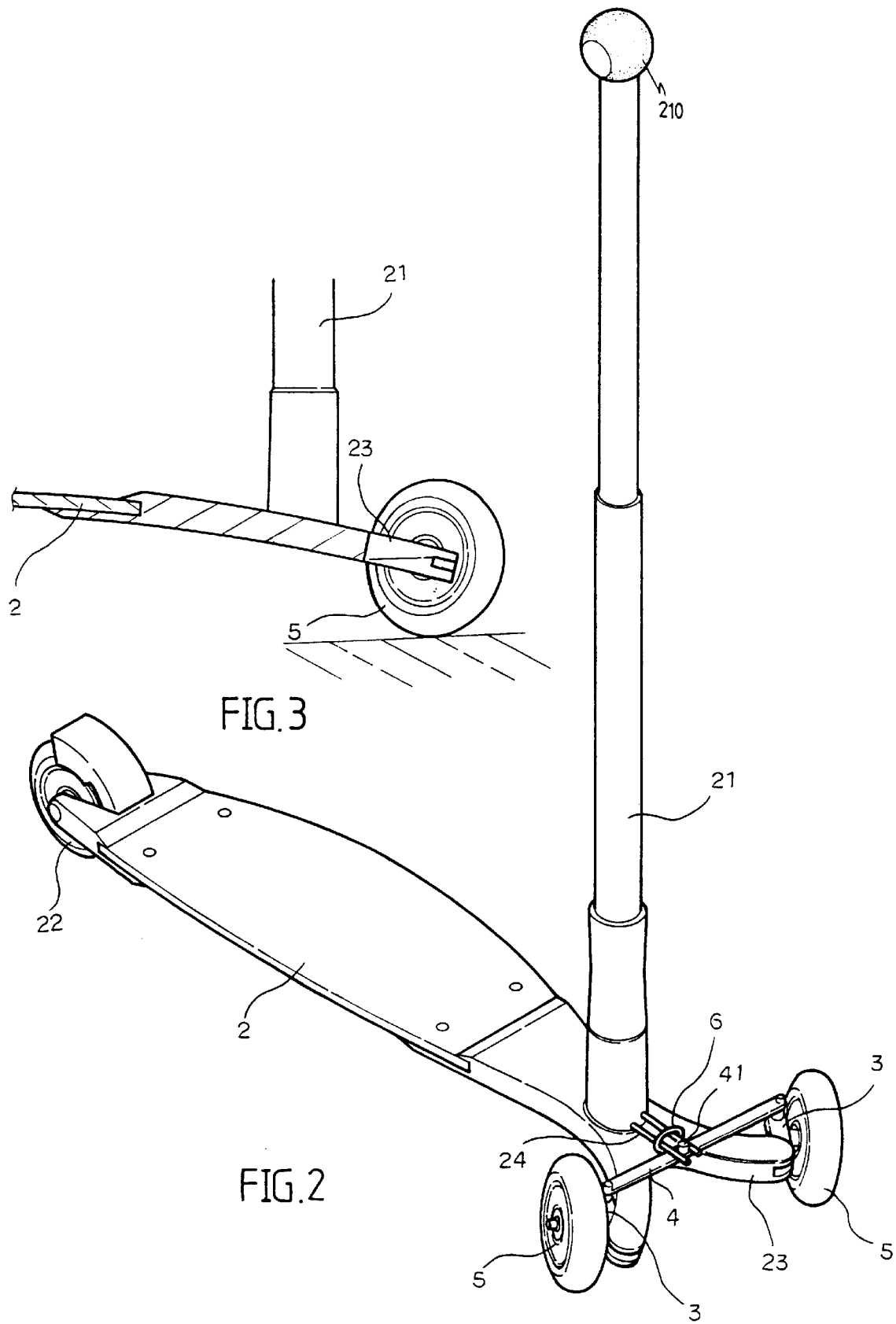
FIG. 2 is a perspective view of the scooter board in accordance with the present invention.
FIG. 3 is an illustrative view to show the branches extending inclinedly downward from the front end of the board.

Referring to FIGS. 1 to 3, the scooter board in accordance with the present invention comprises a board 2 having two branches 23 extending inclinedly downward from the first end thereof and a rear wheel 22 connected to the second end of the board 2. Each of the branches 23 has a slot 230 defined therein.

A control bar 21 extends upwardly from the first end of the board 2 and has a flexible member such as two rods 24 extending therefrom. A knob 210 is connected to the top of the control bar 21.

A transverse plate 4 is located between the two branches 23 and has a protrusion 41 extending from the mediated point of the top surface thereof. The protrusion 41 is securely clamped between the two rods 24 by a ring 6 and the rods 24 are made of flexible material so that when the user holds the knob 210 and pushes the control bar 21, the transverse plate 4 can be shifted as shown in FIG. 6.

Two links 3 each have the first end thereof pivotally connected to the two ends of the transverse plate 4 and the second end thereof received in the two respective slots 230 so as to be pivotally connected to the branches 3. The two links 3 are pivoted when the transverse plate 4 is shifted. Two front wheels 5 are further connected to the two links 3.

Figure 4:
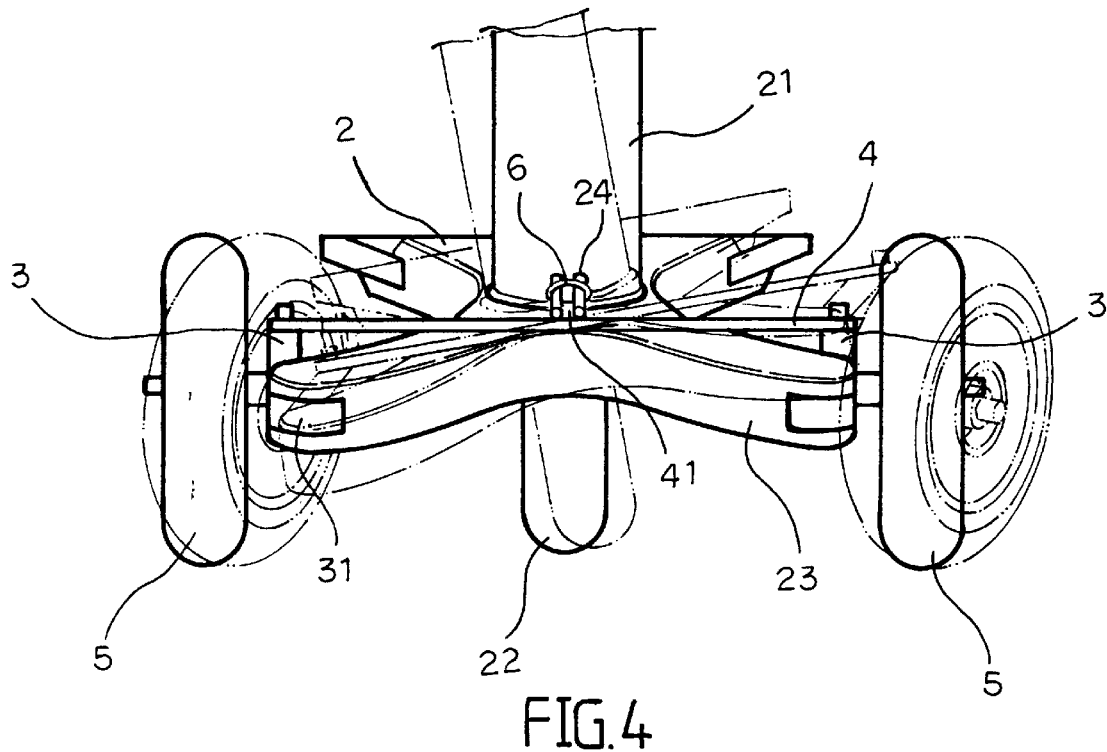
FIG. 4 is a front end illustrative view to show when the control bar is pushed left, the two front wheels turn left.
Figure 5:
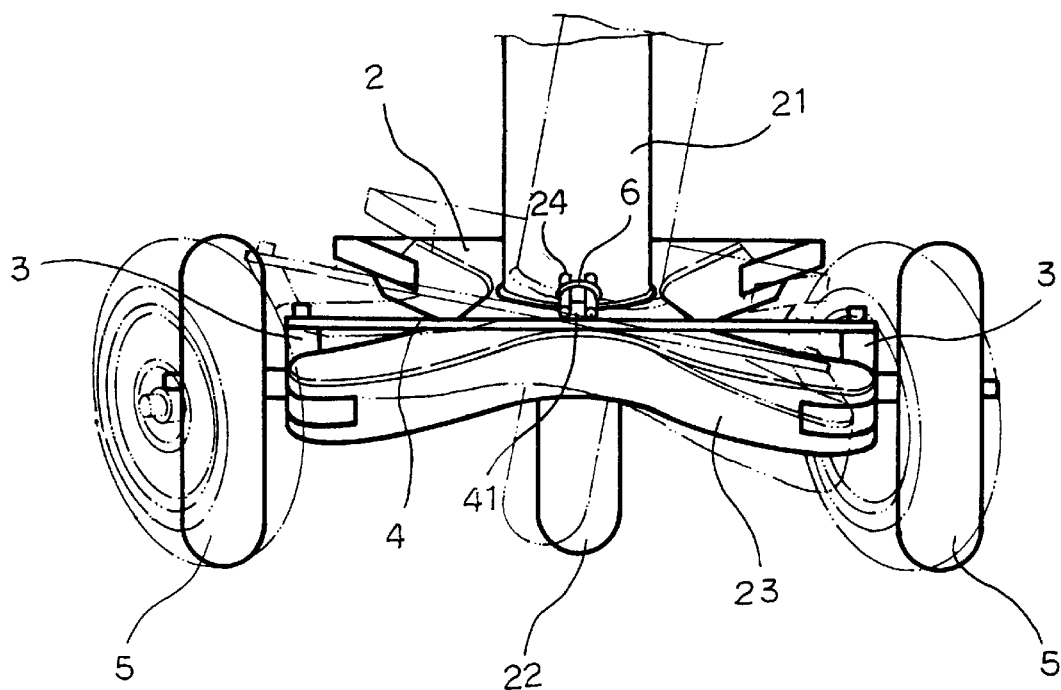
FIG. 5 is a front end illustrative view to show when the control bar is pushed right, the two front wheels turn right.

Referring to FIGS. 4 and 5, because the two rods 24 are made of the material having proper flexibility so that when the control bar 21 is pushed to the left side, the transverse plate 4 is moved to left and the two links 3 are also moved to achieve the purpose of turning. Similarly, when the user wants to turn the scooter board to the right, he/she simply pushes the control bar 21 to the right.

Figure 6:
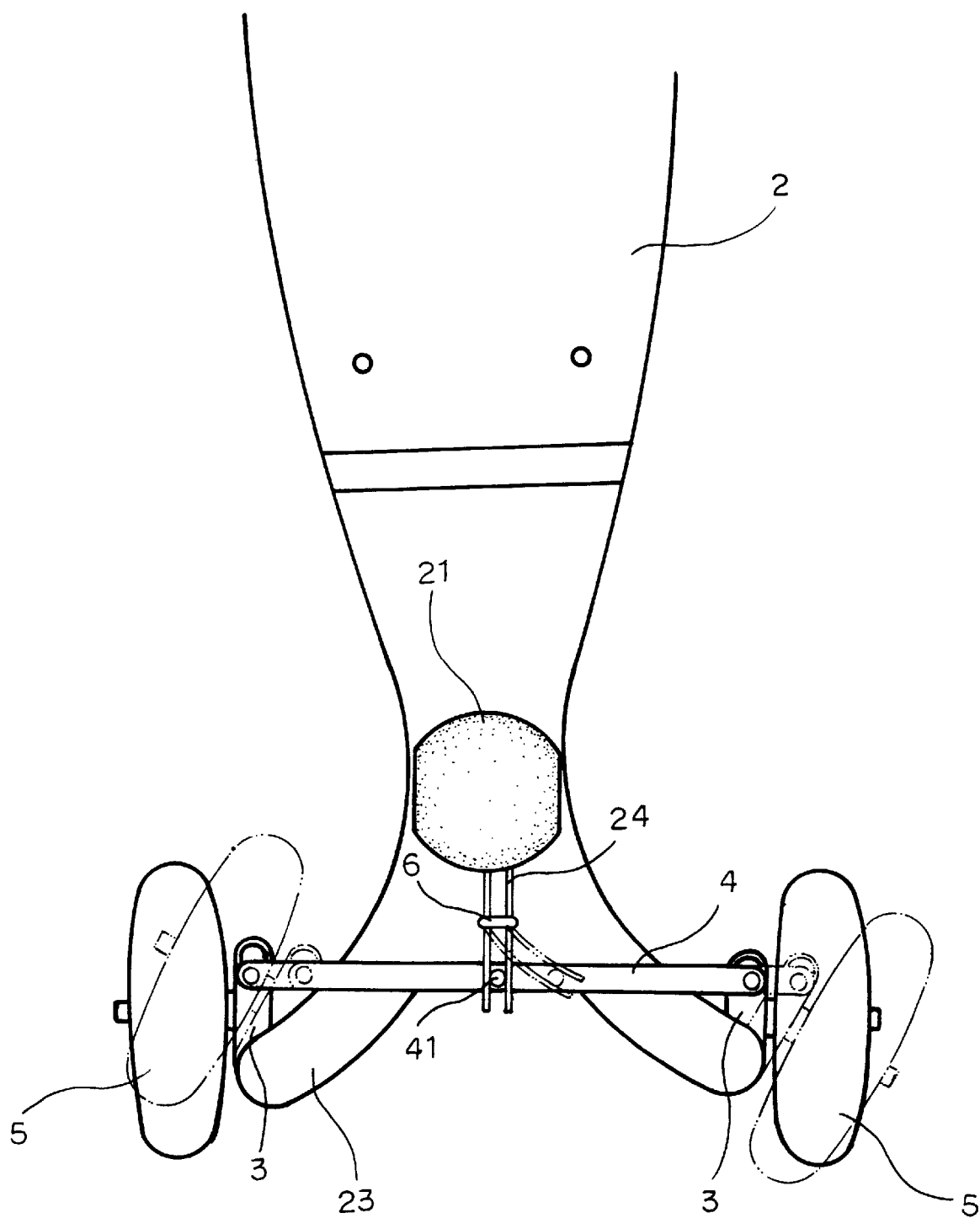
FIG. 6 is a top view to show when the two rods are shifted, the two front wheels turn.

As shown in FIG. 6. When releasing the control bar 2, the return force of the two rods 24 will pull the transverse plate 4 back to its original position so that the two front wheels 5 return to their normal positions. Accordingly, to operate the scooter board is very easy, the user simply holds the knob 210 and pushes the control bar 21 to the desired direction, the scooter board turns to the direction.

While we have shown and described various embodiments in accordance with the present invention, it should be clear to those skilled in the art that further embodiments may be made without departing from the scope and spirit of the present invention.

What is claimed is:

1. A scooter board comprising:

a board having two branches extending inclinedly downward from a first end thereof and a rear wheel connected to a second end of the board, a control bar extending upwardly from said first end of said board and having a flexible member extending therefrom;

a transverse plate having a protrusion extending from a mediated point of a top surface thereof, said protrusion securely connected to said flexible member of said control bar, and two links each having a first end thereof pivotally connected to two ends of said transverse plate, two respective second ends of said two links pivotally connected to said two branches, said two links respectively connected to two front wheels.

2. The scooter board as claimed in claim 1, wherein each of said branches has a slot defined therein so as to engage with the second end of said link corresponding thereto.

3. The scooter board as claimed in claim 1 further comprising a knob connected to the top of said control bar.

4. The scooter board as claimed in claim 1, wherein said flexible member is composed of two rods and a ring is securely mounted to said two rods which clamps said protrusion therebetween.

* * * * *